United States Patent [19]

Vogt

[11] Patent Number: 4,952,926

[45] Date of Patent: Aug. 28, 1990

[54] SELECTIVE CLEARING OF LATCHED CIRCUITS

[75] Inventor: William R. Vogt, Rockaway, N.J.

[73] Assignee: Baker Industries, Inc., Parsippany, N.J.

[21] Appl. No.: 187,684

[22] Filed: Apr. 29, 1988

[51] Int. Cl.[5] ........................ G08B 29/00; H04Q 9/00

[52] U.S. Cl. ........................ 340/825.170; 340/825.360; 340/502

[58] Field of Search ........................ 340/825.63, 825.08, 340/825.34, 825.36, 825.17, 309.4, 313, 314, 500, 501, 502, 644, 525, 309.14

[56] References Cited

U.S. PATENT DOCUMENTS 4,162,488 7/1985 Silverman et al. .................. 340/505
4,524,354 6/1985 Morgan .......................... 340/825.36
4,652,868 3/1987 Hart .................................... 340/501
4,658,249 4/1987 Vogt .............................. 340/825.63

*Primary Examiner*—Donald J. Yusko
*Assistant Examiner*—Peter S. Weissman
*Attorney, Agent, or Firm*—James J. Jennings

[57] ABSTRACT

An alarm system includes a controller and a plurality of transponders having different addresses. Certain of the transponders include switch means for monitoring conditions, and latch circuits to retain memory of the switch conditions. The controller includes means for positive recognition of a latched alarm or trouble condition in any transponder, before the clear-alarm signal or clear-trouble signal is sent from the controller to restore the alarm circuits to their original states. This insures that an alarm or trouble condition at a transponder is not "missed" by inadvertent clearing before a positive recognition is registered in the controller.

3 Claims, 5 Drawing Sheets

SELECTIVE CLEARING OF LATCHED CIRCUITS

The present invention is useful with: a switch monitoring system which continually examines a status signal indicating the switch state, and provides a latched confirmation signal upon verifying that the switch is actually in the state denoted by the status signal. In particular the present invention provides for positive recognition of the latched condition, with subsequent clearing of the latch by a selective signal.

BACKGROUND OF THE INVENTION

Various types of circuits have been employed to determine the status or condition of the switch, and provide an indication of the switch condition. By way of example, U.S. Pat. No. 4,658,249, entitled "Data Communication System With Key Data Bit Denoting Significance of Other Data Bits", which issued Apr. 14, 1987 to William R. Vogt, and is assigned to the assignee of this application, includes a generalized showing of a switch state determination circuit. An improvement to that determination circuit of the '249 patent was subsequently described and claimed in an application entitled "Switch Monitoring Arrangement With Remote Adjustment Capability Having Debounce Circuitry for Accurate State Determination", filed Apr. 29, 1988, Ser. No. 188,323, which issued Aug. 1, 1989 as U.S. Pat. No. 4,853,685 in the name of William R. Vogt, and is assigned to the assignee of the present application. In addition to the remote adjustment feature described in the '685 patent a confirmation signal is produced, and stored in a latch circuit, upon verifying the status signal. This operation, coupled with the remote adjustment feature, produced a significant step forward in this art.

The systems described in the '249 patent and the '685, as well as the present invention, are useful with alarm systems using a polling technique. That is, the various transponders are interrogated, either sequentially, or in a random manner or in some other way, to determine the conditions at each transponder and/or any associated transducer. If there is a large system with many devices and transponders coupled to a single controller, it may take three seconds to complete a poll. It is possible to have a device go briefly into alarm, and emerge from the alarm condition in the time interval just after the associated transponder has been polled and previous to the next polling of that same transponder. It is possible that if more than one point or connected device goes into alarm at once, the several alarms can be cleared simultaneously without recognition at the controller of all the individual units that have been alarmed. Many systems include a "return-to-normal" or "device reset" type of clearing signal which clears all the devices and does not admit of individual identification of a plurality of alarmed units. Moreover in the daytime settings the alarm systems are usually "off", so that if an alarm is transmitted back to a central station, it is cleared by the central station. That is, the alarms are virtually ignored when the system is not activated.

Another condition which could happen in systems which include a "tamper" type of signal, and an "alarm" signal which overrides the tamper signal, can be explained in connection with a motion detector. If an individual were to walk up toward the motion detector and thus generate an alarm signal indicating movement within the protected area, he could rapidly remove the cover from the detector and effect some physical change in the circuit to allow undetected re-entry at a later time. This can occur because in many systems the tamper signal is overridden by the alarm signal.

All these shortcomings of the various systems demonstrate the need for a fire and/or burglar alarm system having switch arrangements which provide outputs such as alarm and trouble, in which after an alarm or trouble signal is given and latched, the specific devices and/or latches can be selectively cleared. It is therefore a principal consideration of the present invention to provide such an effective system for individual, selective clearing of the devices and/or latches.

SUMMARY OF THE INVENTION

The present invention is useful with an arrangement having a controller and at least one transponder which monitors the condition of a switch having at least two possible states. Such an arrangement includes a latch for retaining memory of a given condition, such as the switch state.

The system of this invention includes first means, such as a selector/controller, in at least one of the transponders, for selectively changing the state of the latch in response to a received unlatch signal. A second means, such as a selective clear circuit in the controller, passes the unlatch signal to that one transponder but only after recognizing the given condition (such as "trouble") identified at the one transponder.

THE DRAWINGS

In the several figures of the drawings, like reference numerals identify like components, and in those drawings.

GENERAL SYSTEM DESCRIPTION

Figure 1:
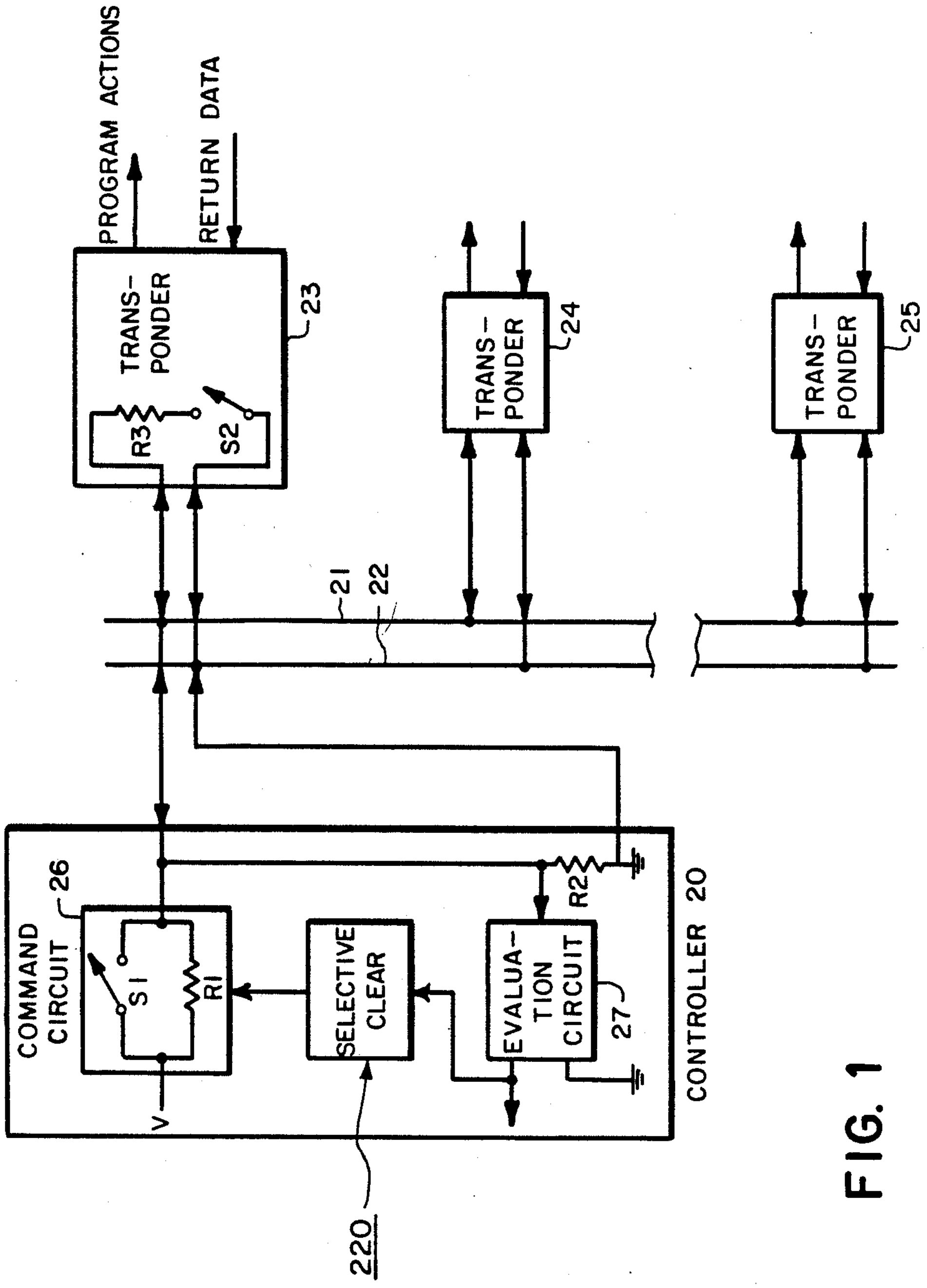
FIG. 1 is a block diagram of an alarm and/or burglary system using addressable transponders, useful with the present invention.

FIG. 1 shows a controller 20 and a plurality of transponders 23, 24 and 25 which can be coupled to the data bus 21, 22. Such an arrangement is set out and described in the '249 patent. In accordance with the present invention, a selective clear stage 220 is incorporated in controller 20. Upon recognizing, in conjunction with evaluation circuit 27, that a particular condition such as alarm or trouble has been latched in one of the addressable transponders, a signal is issued to regulate command circuit 26 and transmit an appropriate signal to the respective transponder to clear the alarm or trouble condition. This is only accomplished after having the condition recognized in the controller 20, after which the selective clear circuit is energized to wipe out the indication at the appropriate transponder. In this way a particular alarm or trouble signal cannot be inadvertently missed at the controller.

Figure 2:
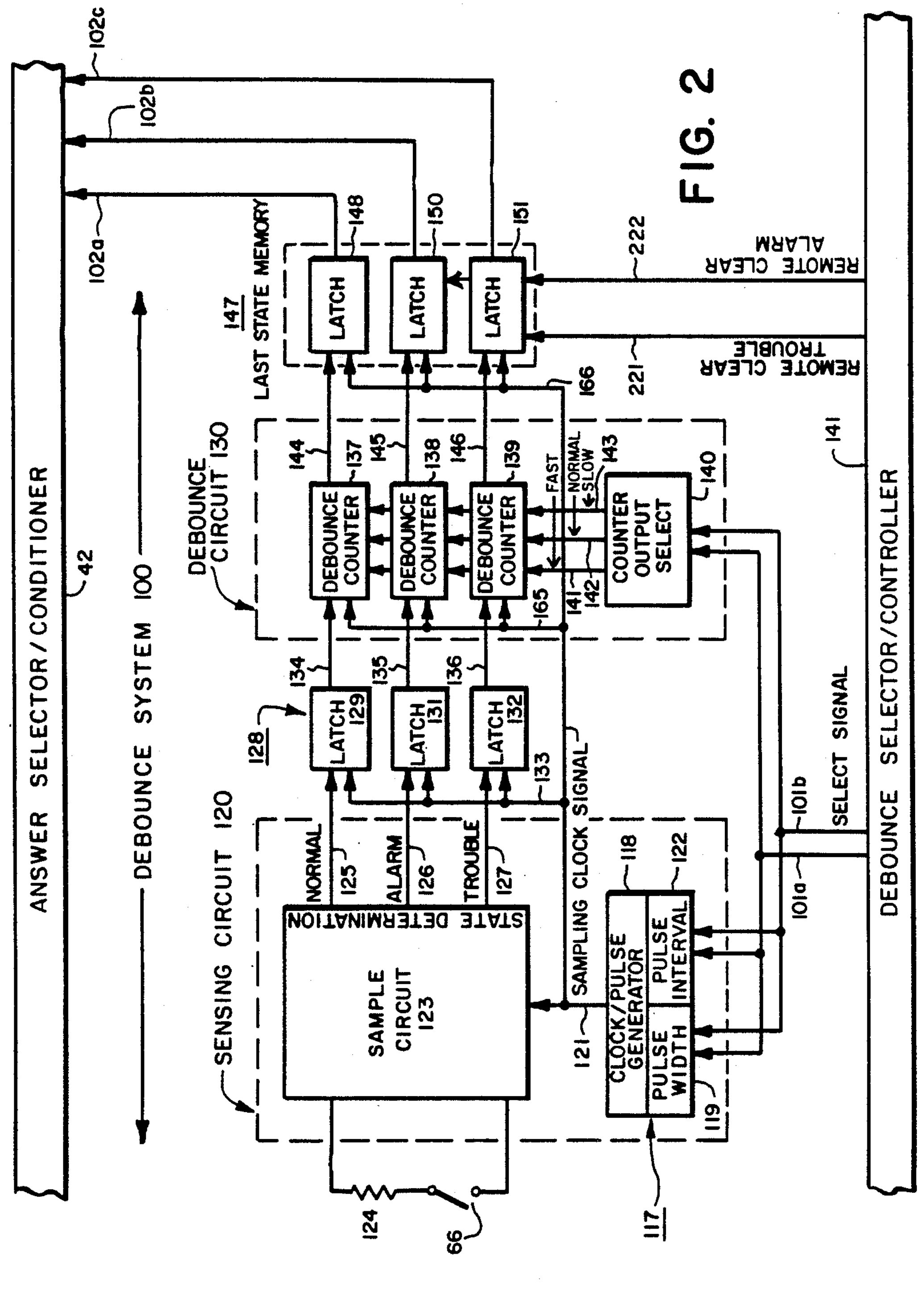
FIG. 2 is a block diagram depicting the incorporation of the invention in a general manner into an alarm and/or fire protection system.

The reference numerals in FIG. 1, except for selective clear circuit 220, are the same as those used in the '249 patent for ready comparison. In FIG. 2 the present invention is depicted in a general way, in conjunction with a debounce system 100 which is described and claimed in the '685 patent. In that '685 patent reference numerals in the 100 series are employed, and they are similarly used in FIG. 2 of this application for ease of correlation with that disclosure. Reference numerals from 220 and above are thus employed to identify the components in the operation of the present invention.

The greater part of FIG. 2 depicts the sensing and debounce circuits described and claimed in the referenced '685 patent. In that disclosure sensing circuit 120 makes a preliminary estimate of the state of switch contact set 66 in sample circuit 123, providing a state determination or a status output signal on one of lines 125, 126, and 127. This initial status signal is reflected through the latch circuit 128, and a signal denoting one of the three states appears on one of the conductors 134, 135 or 136. The respective debounce counters 137, 138 and 139 are set for a preset time period by the fast, normal and slow signals received over one of the lines 141, 142 and 143 through the counter output select circuit 140. If the status signal is present for the time set in the appropriate counter, then a confirmation signal is issued over one of the conductors 144, 145 and 146 to be latched in the last state memory circuit 147, before presentation to the answer selector/conditioner circuit 42. Thus the status signal on one of conductors 125–127 is in the nature of an initial estimate, with a confirmation appearing at the output of the debounce counters 137–139 to indicate that there is a verified condition of the switch state. A more detailed explanation will be found in the '685 patent, which describes how the debounce select signal on conductors 101*a* and 101*b* controls the sampling clock signal on line 121 as well as the output of select circuit 140.

DETAILED DESCRIPTION OF THE INVENTION

FIG. 2 shows the associated components from the '685 patent, and, in accordance with the present invention, shows a conductor 221 coupled between debounce selector/controller 141 and trouble latch 151. In addition the inVention includes another conductor 222 coupled between selector/controller 141 and alarm latch 150. Selective application of a clear trouble signal over line 221 to change the state of latch 151 back to an original setting is achieved after recognition in the controller that the trouble condition has been signalled, and the selective clear circuit 220 in the controller is energized to effect the clearing through the debounce selector/controller 141 in the transponder. Similarly a selective alarm clear signal is sent over conductor 222 to restore latch 150 to its original condition after being identified in the controller as an alarm condition.

Figure 3:
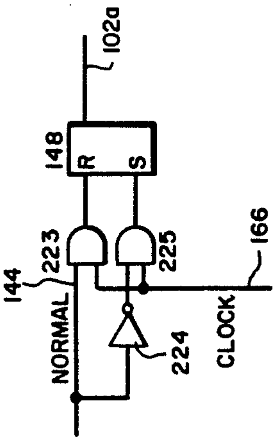
FIG. 3 is a simple block diagram of a latch circuit.

FIG. 3 depicts the manner of operation of a latch, such as normal latch 148, when selective clearing is not utilized. In such an arrangement the normal signal is received over conductor 144 and applied to one input of an AND circuit 223, the other input of which receives a clock signal over conductor 166. With coincident appearance of the signals on conductors 144 and 166, an output signal from AND circuit 223 is applied to the R or set input of R/S flip-flop 148, changing the state of the output signal on conductor 102*a*.When the normal signal disappears from conductor 144, this is indicated through inverter stage 224, which passes a signal over the other AND circuit 225 (coincidently with a clock signal on line 166) to the S or reset input of the flip-flop. This changes the state of the output signal on line 102*a*. This represents an automatic restoration of the latch condition, as is sometimes accomplished in prior art systems, so that the conditions at the transponder occur internally and the transponder cannot "know" if the condition was ever really registered back at the controller.

Figure 4:
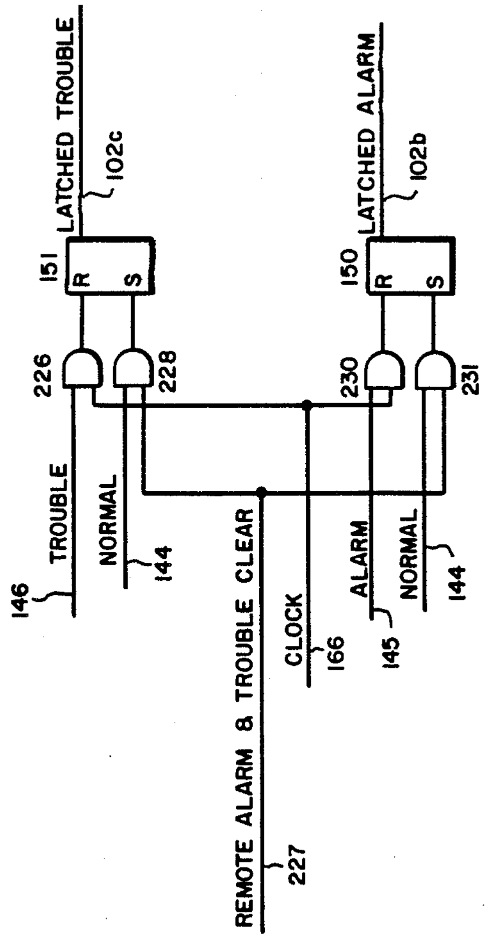
FIGS. 4–7 are block diagrams of various circuits for implementing the invention.

FIG. 4 depicts the selective clearing of both the alarm and trouble latches from the controller with single signal, in accordance with one aspect of the invention. In this arrangement the alarm and trouble latches are both R/S flip-flops, and such common units will be used to illustrate this and the other embodiments of the invention. When a trouble signal is received over line 146 and passed through AND gate 226, the output of flip-flop 151 switches into a latched trouble condition. This condition cannot be returned to "not trouble", or the reset of flip-flop 151 performed, until there is not only a selective clearing signal received over conductor 227 from the controller, but in addition the normal signal must appear on line 144 to be passed (with the clearing signal) through AND circuit 228 to the reset input of flip-flop 151. In the same way the alarm latch 150 can be switched into alarm when a signal appears over line 145 and is gated through AND gate 230. To be reset this flip-flop must receive not only the normal signal at AND gate 231, but also the selective clearing for both the alarm and trouble stages over line 227. In this way both the trouble and alarm latches are cleared simultaneously, but only after recognition at the controller that at least one of the trouble and alarm conditions has been encountered.

Figure 5:
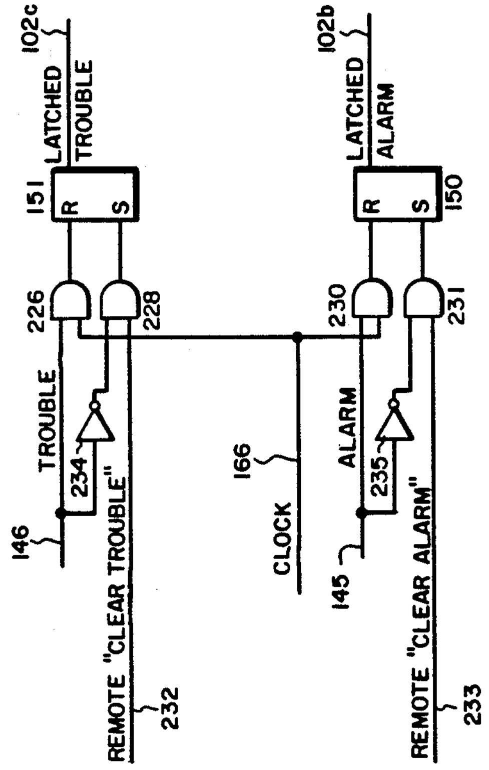

FIG. 5 depicts a selective clearing arrangement in which two separate signals must be sent from the controller, one over conductor 232 to clear the trouble condition, and the other over conductor 233 to clear the alarm condition. As shown the trouble latch 151 can be set by the signal received over the trouble line 146 and the simultaneous appearance of the clock signal at AND gate 226. However to be cleared, not only must the individual, selective "clear trouble" signal appear on conductor 232, but inverter stage 234 must go high, indicating there is no trouble signal on conductor 146. In the same way alarm latch 150 is set by the simultaneous presentation of the clock signal and alarm signal at AND gate 230. Inverter 235 must go high, indicating disappearance of the alarm signal from conductor 145, simultaneously with presentation of the "clear alarm" signal o line 233 to unlatch stage 150.

Figure 6:
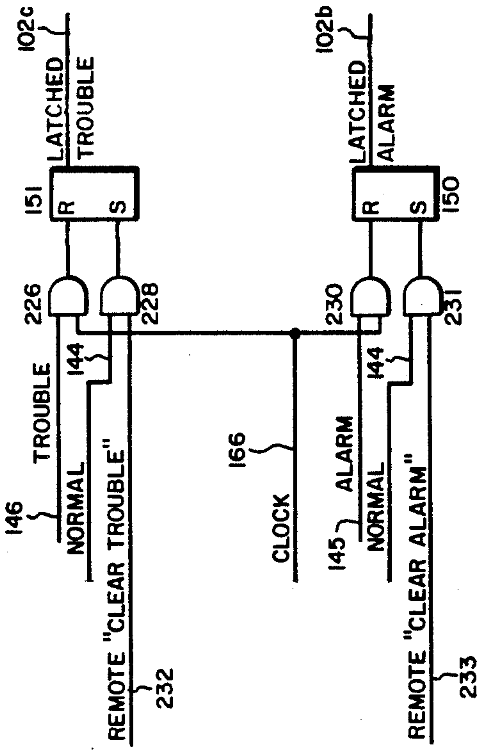

FIG. 6 depicts a variation of the circuit shown in FIG. 4 in which the addressed transponder receives a plurality of clear signals; the transponder is cleared both by address and by type of signal. That is, a remote "clear trouble" signal must be received over conductor 232 at the same time that a normal signal is received over conductor 144, to reset stage 151 after it has been latched in the trouble condition. Similarly a separate "clear alarm" signal must be received over conductor 233 coincidently with a normal signal on line 144, to reset flip-flop 150 after it has been latched into the alarm-indicating condition. This arrangement also insures that both trouble and alarm signals are individually seen, and cleared only after their individual recognition in the controller.

Figure 7:
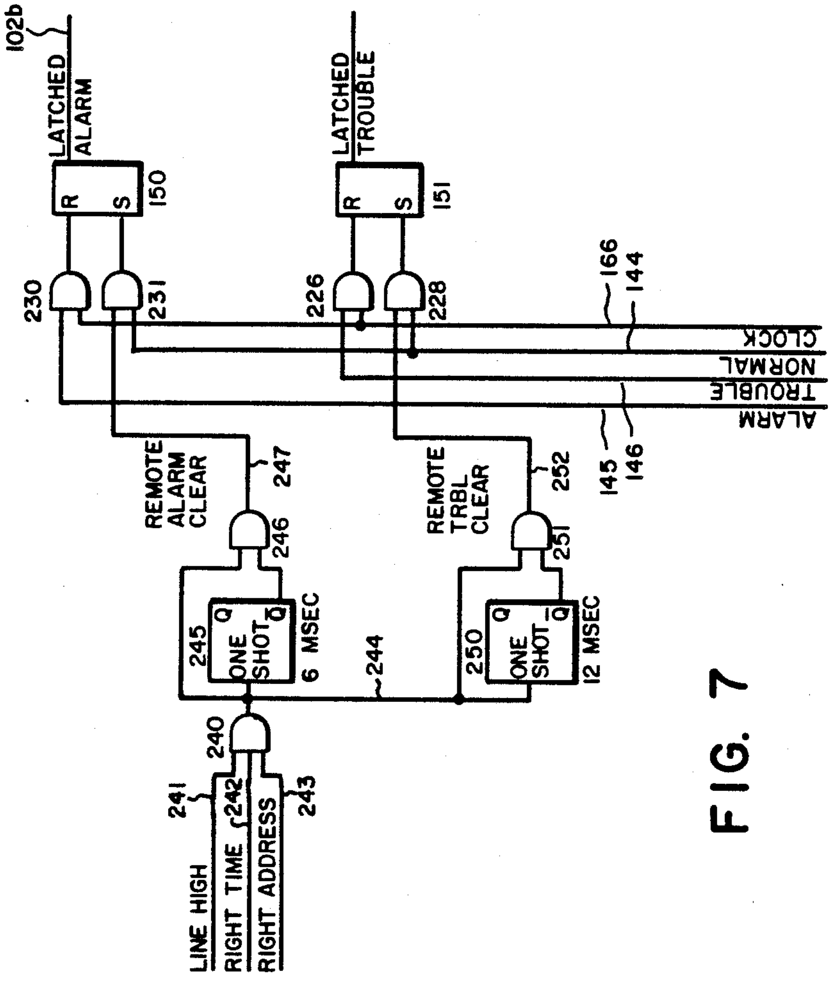

FIG. 7 indicates the clearing of both the alarm and trouble latches with a single signal, produced at the output of AND gate 240 upon receipt of three separate signals over conductors 241, 242 and 243. These conductors carry signals respectively indicating "line high", "right time", and "right address". This means that the lines are high, a communication technique described in the '249 patent; it is the right time, that is, it is the appropriate interval for the clearing pulse to be sent from the controller to the transponder; and it is the right address, that is, the transponder receiving the clearing signal is that just addressed from the controller. When all three signals appear simultaneously, AND gate 240 provides an output signal on line 244 of the type shown generally in FIG. 8A

Multivibrator or flip-flop 245 is a one-shot type unit, and is coupled between line 244 and one input of AND gate 246. The other input of this AND gate is also coupled to line 244. Arbitrarily this one-shot 245 is set for a predetermined time integral, shown as six milliseconds in this embodiment. This produces an output waveform such as that shown in FIG. 8B, and the output of one-shot 245 does not go high again until time t1. At this time, coincident with the signal from FIG. 8A on the other input of AND gate 246, a remote alarm clear signal appears on line 247, of the type shown in FIG. 8C. This signal is present in the time interval t1 to t3, and is effective in conjunction with the presentation of the normal signal over line 144, to pass a signal through gate 231 and unlatch the R/S flip-flop 150.

Figures 8A, 8B, 8C, 8D, 8E:
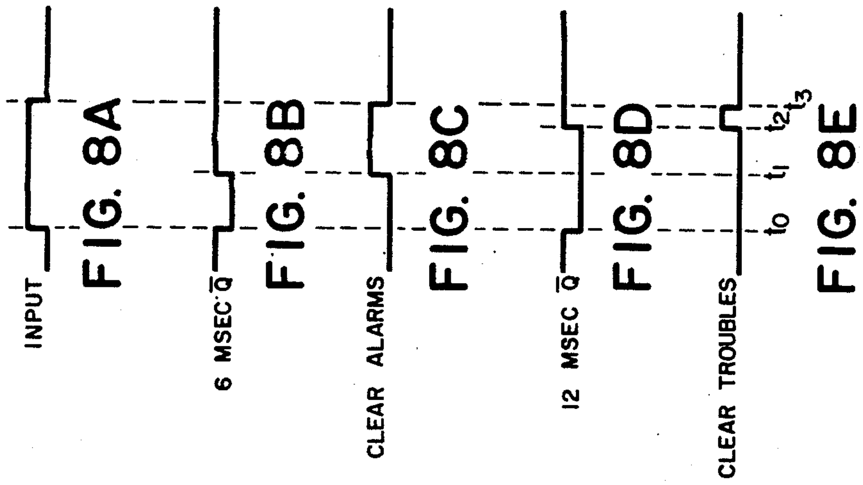
FIGS. 8A–8E are graphical illustrations useful in understanding operation of the present invention.

One-shot stage 250 produces an output signal of a longer duration, 12 milliseconds in this embodiment, as shown in FIG. 8D. The output goes low at time tO and does not go high again until time t2. Thus at time t2 the signal at the lower gate of AND circuit 251 goes high, and the signal from line 244 shown in FIG. 8A is already present at the other input of AND gate 251. Tis results in an output "remote trouble clear" signal on line 252, of the type shown in FIG. 8E. This signal appears at one input of AND gate 228, the other input of which receives the normal signal over line 144. When both these signals are present the output of AND gate 228 is passed through the reset input of stage 151 and unlatches this trouble stage.

It is very important to "catch" the trouble indications, because as described above, during the day and other "alarm off" times, an alarm system is set to ignore alarm signals returned from a transponder or control point. A trouble indication can be caused by a person tampering with equipment, and is important that such a condition be recognized at the controller before a reset signal is sent down to the transponder. The present invention not only provides such positive recognition at the controller, but also affords selective clearing by a specific address, selective clearing by both address and the type of condition (normal, alarm, and so forth), and even a very positive condition in which separate clear signals are provided for alarm and trouble, in conjunction with signals indicating the system has returned to the normal condition or operation.

In the appended claims the term "connected" means a d-c connection between two components with virtually zero d-c resistance between those components. The term "coupled" indicates there is a functional relationship between two components, with the possible interposition of air or other elements between the two components described as "coupled" or "intercoupled".

While only particular embodiments of the invention have been described and claimed herein, it is apparent that various modifications and alterations of the invention may be made. It is therefore the intention in the appended claims to cover all such modifications and alterations as may fall within the true spirit and scope of the invention.

What is claimed is:

1. An alarm system having a data bus, a controller coupled to the data bus, and a plurality of transponders with different addresses all coupled to the data bus, at least one of said transponders including latch means comprising a first latch to indicate an alarm condition and a second latch to indicate a trouble condition, and means, including two timing means for producing two different duration signals, for effecting clearing of the alarm latch upon receipt of a first clear signal of a first given time duration and for clearing the trouble latch upon receipt of a second clear signal of a duration longer than said first signal, and a selective clear circuit in said controller, for passing the appropriate clear signal to said one transponder only after recognizing the alarm or trouble condition identified at said one transponder.

2. An alarm system including a controller and a plurality of transponders with different addresses, at least some of said transponders being capable of communication with the controller, at least one of said transponders including latch means comprising a first latch to indicate a first condition and a second latch to indicate a second condition different than said first condition, and means for producing two different clear signals, for clearing the first latch upon receipt of a first clear signal having a first characteristic and for clearing the second latch upon receipt of a second clear signal having a second characteristic different than said first characteristic, and a selective clear circuit in said controller, for passing the appropriate clear signal to said one transponder only after recognizing the first or second condition identified at said one transponder.

3. An alarm system as claimed in claim 2, in which said first condition is an alarm condition and said second condition is a trouble condition.

* * * * *